United States Patent [19]
Shimizu et al.

[11] Patent Number: 6,121,390
[45] Date of Patent: Sep. 19, 2000

[54] PROCESS OF PRODUCING VINYL CHLORIDE POLYMER BY USING CONDENSATION PRODUCT OF DIMER OF 2,3-DIHYDROXYNAPHTHALENE AND FORMALDEHYDE

[75] Inventors: Toshihide Shimizu, Urayasu; Tatsuya Fujimoto; Seiji Fukuda, both of Hasaki-machi, all of Japan

[73] Assignee: Shin-Etsu Chemical Co., Ltd., Tokyo, Japan

[21] Appl. No.: 09/019,803

[22] Filed: Feb. 6, 1998

[30] Foreign Application Priority Data

Feb. 7, 1997 [JP] Japan ................................. 9-039881

[51] Int. Cl.$^7$ ........................................................ C08F 2/20
[52] U.S. Cl. ................................................................ 526/62
[58] Field of Search ................................................ 526/62

[56] References Cited

U.S. PATENT DOCUMENTS

| | | | |
|---|---|---|---|
| 4,431,783 | 2/1984 | Walker et al. | 526/62 |
| 5,508,361 | 4/1996 | Shimizu et al. | 526/62 |
| 5,576,370 | 11/1996 | Shimizu et al. | 524/413 |
| 5,616,660 | 4/1997 | Shimizu et al. | 526/62 |

FOREIGN PATENT DOCUMENTS

| | | |
|---|---|---|
| 0 534 434 | 3/1993 | European Pat. Off. . |
| 0 598 537 | 5/1994 | European Pat. Off. . |
| 0 653 441 | 5/1995 | European Pat. Off. . |

*Primary Examiner*—Christopher Henderson
*Attorney, Agent, or Firm*—Oblon, Spivak, McClelland, Maier & Neustadt, P.C.

[57] ABSTRACT

There is provided a polymer scale deposition preventive agent, comprising an alkaline solution of a condensation product having a molecular weight of 500 to 1,000,000 obtained by condensing a dimer compound of 2,3-dihydroxynaphthalene with formaldehyde. By polymerizing vinyl chloride or a monomer mixture containing vinyl chloride in a polymerization vessel wherein a coating film made of said polymer scale deposition preventive agent has been formed on the inner wall surface and the like, polymer scale is effectively prevented from depositing not only on an agitation apparatus but also on areas near the interface between a gas phase and a liquid phase, which prevention of the polymer scale deposition is conventionally difficult. Thus, a vinyl chloride polymer can be obtained which contains colored foreign matters, fish eyes, etc. in small amounts and is small in initial discoloration and is good in quality.

11 Claims, No Drawings

PROCESS OF PRODUCING VINYL CHLORIDE POLYMER BY USING CONDENSATION PRODUCT OF DIMER OF 2,3-DIHYDROXYNAPHTHALENE AND FORMALDEHYDE

BACKGROUND OF THE INVENTION

1. Field of the Invention

The present invention relates to a polymer scale deposition preventive agent and a process of producing a vinyl chloride polymer by using the same.

2. Description of the Prior Art

Generally a vinyl chloride polymer is produced by polymerizing vinyl chloride monomer or a vinyl monomer mixture mainly comprised of vinyl chloride monomer in the presence of a polymerization initiator. At that time, polymer scale tends to deposit on sites in a polymerization vessel with which the vinyl chloride monomer or the monomer mixture comes in contact, such as the inner wall of the polymerization vessel and an agitation apparatus in the polymerization vessel.

The polymer scale deposition results in a decrease in the yield of the polymer and a decrease in the cooling ability of the polymerization vessel. In addition, when the deposited polymer scale comes off to mix in the resulting polymer, fish eyes are produced in formed products, such as sheets, obtained by forming the polymer, whereby the quality of the formed products is extremely lowered.

The formed product is discolored more or less even where a discoloring agent is not added. This discoloration is called initial discoloration and is desirably minimized as far as possible. Also, the initial discoloration become stronger due to the mixing of polymer scale.

To remove polymer scale from the inner wall and the like of the polymerization vessel requires excessive labor and time. The polymer scale contains unreacted monomers which are highly hazardous to the human body and therefore involves a problem of safety.

With respect to the prevention of polymer scale from depositing, conventionally, there are known a method wherein a polymerization vessel inner wall surface is coated with a polymer scale deposition preventive agent comprised of a polar organic compound, such as an amine compound, a quinone compound, and an aldehyde compound, to form a coating film, as carried out, for example, in suspension polymerization of vinyl chloride and a method wherein such a polymer scale deposition preventive agent is added to an aqueous medium in suspension polymerization (Japanese Patent Publication (KOKOKU) No. 45-30343).

Coating with a polymer scale deposition preventive agent is generally carried out once for polymerization of one batch and in some cases once for polymerization of several batches (2 to 6 batches). Where the above polymer scale deposition preventive agent is used at this frequency, the polymer scale deposition preventive effect is exhibited until the polymerization is carried out to the extent of 5 to 6 batches, but, the preventive effect cannot be obtained at more batches. Particularly, where a water-soluble catalyst is used in polymerization, its influence is so remarkable that an industrially satisfactory result cannot be obtained.

To overcome this disadvantage, for example, a method is suggested wherein a coating film is formed by coating the inner wall surface or the like of a polymerization vessel with a polymer scale deposition preventive agent whose active ingredient is a condensation product of an aromatic amine compound with an aromatic nitro compound (Japanese Patent Publication (KOKOKU) No. 60-30681), a reaction product of a phenolic compound with an aromatic aldehyde (Japanese Pre-examination Patent Publication (KOKAI) No. 57-192414), a reaction product of a polyhydric phenol with an aliphatic aldehyde (Japanese Patent Publication (KOKOKU) No. 57-502169), or a reaction product of 1-naphthol with formaldehyde (Japanese Patent Publication (KOKOKU) No. 01-31523). Where these polymer scale deposition preventive agents are applied at the above frequency, even after the polymerization is carried out to the extent of 100 to 200 batches, polymer scale is not deposited on the liquid phase part in the polymerization vessel. The same is secured even where the above water-soluble catalyst is used.

Even the use of these polymerization scale deposition preventive agents is, however, accompanied by the defect that polymer scale is still deposited near the interface between a gas phase and a liquid phase located at the upper part of a polymerization vessel, on an agitator and the like in the polymerization vessel. The polymer scale deposited on these sites tends to grow as the polymerization is repeated, and the polymer sale may come off easily.

As means of solving these defects, there is proposed a polymer scale deposition preventive agent comprising an alkaline solution containing a condensation product of a hydroxynaphthalene compound with an aldehyde compound and an inorganic colloid (Japanese Pre-examination Patent Publication (KOKAI) No. 06-206909). The use of this polymer scale deposition preventive agent can prevent polymer scale from depositing, for example, near the interface between the gas and liquid phases.

The polymer scale deposition preventive agent is applied at such a frequency that it is applied once for polymerization of 1 to 6 batches, but where the number of batches for polymerization is increased, for example, to over 50 to 100 batches, the application is carried out more frequently.

The use of the above polymer scale deposition preventive agent increases gradually, however, the thickness of the coating film on areas including baffles, a shaft, agitating blades and the like in a polymerization vessel, and in some cases this thick coating film comes off to mix in the polymer. In particular, in the case where an inorganic colloid is added to a polymer scale deposition preventive agent, the coating film is liable to become thick and is likely peeled off.

The mixing of the peeled coating film in the polymer brings about colored foreign particles, a defect, and therefore the quality of formed products is damaged markedly.

SUMMARY OF THE INVENTION

Therefore, an object of the present invention is to provide a polymer scale deposition preventive agent which can prevent effectively polymer scale in polymerization of vinyl chloride monomer a monomer mixture containing vinyl chloride from depositing not only on the liquid phase wall surface but also, for example, even on an agitation apparatus and near the interface between a gas phase and a liquid phase where prevention of deposition of polymer scale is conventionally difficult and which does not allow colored foreign matters to be formed.

A further object of the present invention is to provide a process of producing a vinyl chloride polymer little or few in initial discoloration, colored foreign matters, fish eyes and the like, and excellent in quality, by using the above polymer scale deposition preventive agent.

To attain the above objects, the present invention provides a polymer scale deposition preventive agent comprising an alkaline solution of a condensation product having a molecular weight of 500 to 1,000,000 obtained by condensing a dimer compound of 2,3-dihydroxynaphthalene with formaldehyde.

Further, the present invention provides a process of producing a vinyl chloride polymer by polymerizing vinyl chloride monomer or a vinyl monomer mixture mainly comprised of vinyl chloride monomer in a polymerization vessel, wherein a coating film consisting of said polymer scale deposition preventive agent has been formed on the inner wall surface of the polymerization vessel and areas with which said monomer or said vinyl monomer mixture comes in contact during the polymerization.

According to the polymer scale deposition preventive agent of the present invention, in polymerizing vinyl chloride monomer or said vinyl monomer mixture, polymer scale can be effectively prevented from depositing not only on the liquid phase wall surface in a polymerization vessel but also, for example, on an agitation apparatus and near the interface between the gas phase and the liquid phase. Further, the obtainable polymer can be quite more decreased in colored foreign particles than the conventional polymer. Besides the molded product molded from the obtained product, such as a sheet, has much less fish eyes and little initial discoloration and hence is high in quality.

DETAILED DESCRIPTION OF THE PREFERRED EMBODIMENTS

Hereinafter, the present polymer scale deposition preventive agent and the present process of producing a vinyl chloride polymer by using the same are described in detail.

Polymer Scale Deposition Preventive agent

The polymer scale deposition preventive agent of the present invention comprises an alkaline solution containing a condensation product (hereinafter referred to as "specified condensation product"), which has a molecular weight of 500 to 1,000,000, of a dimer compound of 2,3-dihydroxynaphthalene with formaldehyde as is described above.

Specified Condensation Product

The specified condensation product is obtained by condensing a diner compound of 2,3-dihydroxynaphthalene with formaldehyde in a suitable medium in the presence of a basic catalyst. The dimer compound of 2,3-dihydroxynaphthalene is 2,3,2',3'-tetrahydroxybinaphthyl.

The reaction molar ratio [(A)/(B)] of the dimer compound (A) of 2,3-dihydroxynaphthalene to formaldehyde (B) is affected by the type of the basic catalyst, the reaction temperature, the reaction time, etc., and is in the range of generally from 1.0/0.5 to 1.0/1.5, and preferably from 1.0/0.7 to 1.0/1.2. If the amount of formaldehyde is too large or too small, the effect of the polymer scale deposition preventive agent is lowered.

Said basic catalyst includes, for example, NaOH, KOH, LiOH, and NH$_4$OH, with preference being given to NaOH.

The basic catalyst is used in an amount corresponding to generally 0.1 to 10 mol, and preferably 0.3 to 2 mol, per mol of the diner compound of 2,3-dihydroxynaphthalene.

As the medium of the condensation reaction, generally, water is used.

It is advisable that the temperature of the condensation reaction be generally 40° to 100° C., and preferably 50° to 80° C., and the reaction temperature be generally 1 to 20 hours, and preferably 2 to 10 hours.

The specified condensation product obtained by this condensation reaction is supposed to be represented by the following formula:

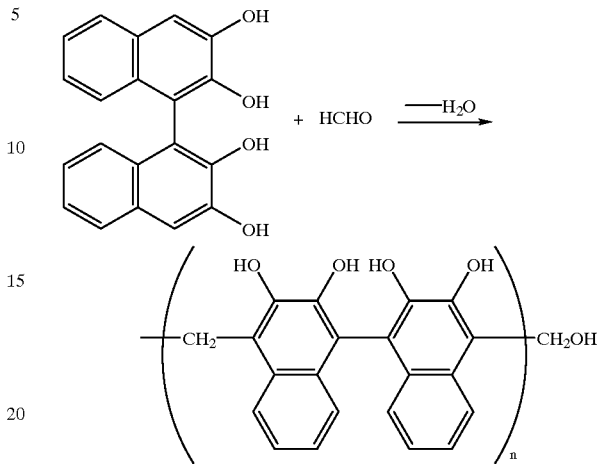

wherein n is a number satisfying that the molecular weight of the condensation product is 500 to 1,000,000.

The number-average molecular weight of the specified condensation product is in the range of 500 to 1,000,000, preferably 2,500 to 600,000, and particularly preferably 5,000 to 100,000 in terms of a polyethylene glycol. Additionally stated, the molecular weight is measured by gel permeation chromatography (GPC). If the molecular weight of the specified condensation product is less than 500, the polymer scale deposition preventive effect cannot be satisfactorily secured. In contrast, if the molecular weight is over 1,000,000, the solubility of the condensation product in water and organic solvents in the preparation of the polymer scale deposition preventive agent is lowered and the polymer scale deposition preventive effect cannot be satisfactorily secured.

In passing, to obtain the diner compound of 2,3-dihydroxynaphthalene, it is advisable that, for example, 2,3-dihydroxynaphthalene be condensed in a suitable solvent in the presence of an oxidation catalyst at generally 40° to 200° C., and preferably 50° to 90° C. The reaction time is generally 1 to 30 hours, and preferably 2 to 10 hours.

The above oxidation catalyst includes, for example, a molecular simple halogen, such as iodine, bromine, chlorine, and fluorine; an oxyacid or an oxyacid salt of a halogen, such as iodic acid, periodic acid, potassium periodate, and sodium perchlorate; an inorganic peroxide, such as hydrogen peroxide, sodium peroxide, potassium persulfate, sodium perchlorate, potassium persulfate, and ammonium persulfate; an organic peroxide, such as peracetic acid, benzoyl peroxide, cumene hydroperoxide, perbenzoic acid, and p-menthane hydroperoxide; a chloride or a sulfate of iron or copper (e.g., ferrous chloride, ferric chloride, copper sulfate, copper chloride); an azo compound, such as α,α'-azobisisobutyronitrile, α,α'-azobis-2,4-dimethylvaleronitrile; and an aromatic nitro compound, such as nitrobenzene, o-, m-, and p-hydroxynitrobenzene, o-, m-, and p-nitroanisole, o-, m-, and p-chlorobenzene, o-, m-, and p-nitrobenzoic acid, and o-, m-, and p-nitrobenzenesulfonic acid.

The medium used in the above condensation reaction (dimerization reaction) includes, for example, an organic solvent, such as alcohols, ketones, and esters, with preference being given to an organic solvent miscible with water.

The organic solvent miscible with water includes, for example, alcohols, such as methanol, ethanol, and propanol; ketones, such as acetone and methyl ethyl ketone; and esters, such as methyl acetate and ethyl acetate, with particular preference being given to alcohols.

Further, a mixed solvent of water with an organic solvent miscible with water can also be used.

Preparation of Polymer Scale Deposition Preventive agent

The polymer scale deposition preventive agent of the present invention can be obtained as an alkaline solution by dissolving the above specific condensation product in an aqueous medium and adjusting the pH generally to 8 to 14, preferably 9 to 14, and more preferably 9.5 to 12.5.

The amount of the specific condensation product contained in the polymer scale deposition preventive agent may be generally 0.005 to 10% by weight, and preferably 0.03 to 5.0% by weight.

The above aqueous medium may be generally water or a mixed solvent comprised of water as a major component and an organic solvent miscible with water (e.g., a hydrophilic organic solvent). The hydrophilic organic solvent includes, for example, alcohols, such as methanol and ethanol; ketones, such as acetone and methyl ethyl ketone; and esters, such as methyl acetate, with particular preference being given to alcohols.

The amount of the hydrophilic organic solvent contained in said mixed solvent is in such an amount that it neither leads to risk, such as inflammation and volatilization nor brings about a problem, such as toxicity, and specifically the amount is generally 50% by weight or less, preferably 30% by weight or less, and particularly preferably 10% by weight or less, based on the amount of the mixed solvent, i.e., the total amount of the water and the hydrophilic solvent.

For the adjustment of the pH, an alkali compound, such as NaOH, KOH, LiOH, or $NH_4OH$, is used.

Water-Soluble Compound

It is desired that a water-soluble polymer compound is added to the polymer scale deposition preventive agent of the present invention. This addition can further improve the polymer scale deposition preventive effect. It is supposed that the water-soluble polymer compound has such an action that it interacts with the above specific condensation product to increase the hydrophilic property of a surface to be applied or to enhance the adhesion of the polymer scale deposition preventive agent to the polymerization vessel inner wall.

The water-soluble polymer includes, for example, nonionic polymer compounds, such as gelatin, casein and the like; alkylene oxide polymers, such as ethylene oxide polymer, ethylene-propylene oxide polymer and the like; anionic polymer compounds, such as polyacrylic acid, polystyrenesulfonic acid, carboxymethyl cellulose, alginic acid and the like; cationic nitrogen-containing polymer compounds, such as polyvinyl pyrrolidone, chitosan, polyacrylamide and the like; and hydroxyl group-containing polymer compounds, such as polyvinyl alcohol, hydroxyethyl cellulose, hydroxypropyl cellulose, pectin and the like, with preference being given to gelatin, polyacrylic acid, carboxymethyl cellulose, polyvinyl pyrrolidone, polyvinyl alcohol, and pectin.

These water-soluble polymer compounds may be used singly or in a combination of two or more thereof.

Generally the water-soluble polymer compound is added in an amount of 0 to 200 parts by weight, preferably 0.1 to 100 parts by weight, and particularly preferably 1 to 50% by weight, per 100 parts by weight of the specific condensation product.

Other Additive

To the polymer scale deposition preventive agent of the present invention, may be added at least one selected from the group consisting of inorganic colloids and alkali metal silicates to the extent that does not impair the effect of the present invention.

The inorganic colloids are particulate colloids produced by a dispersion process or a condensation process wherein water is used as a dispersion medium. The size of the colloidal particles is generally 1 to 500 $\mu$m and preferably 5 to 100 $\mu$m. The inorganic colloids include, for example, a colloid of an oxide of a metal selected from the group consisting of aluminum, thorium, titanium, zirconium, antimony, tin, and iron or a colloid of a hydroxide of these metals; a colloid of tungstic acid, vanadium pentoxide, gold or silver; silver iodide sol; and a colloid of selenium, sulfur, or silica. They may be used singly or in a combination of two or more.

The silicates of alkali metals include, for example, metasilicates ($M_2SiO_3$), orthosilicates ($M_4SiO_4$), disilicates ($M_2Si_2O_5$), trisilicates ($M_3Si_3O_8$), sesquisilicates ($M_4Si_3O_{10}$), etc., wherein M denotes an alkali metal of alkali metals, such as lithium, sodium, potassium and the like, as well as water glass. They may be used singly or in a combination of two or more.

Formation of Coating Film

The polymer scale deposition preventive agent of the present invention is coated on the inner wall surface of a polymerization vessel, areas with which a monomer comes in contact during polymerization, and the like. To form a coating film, first, a coating liquid comprising the polymer scale deposition preventive agent is coated on the polymerization vessel inner wall, and the like, and is then dried at a temperature in the range of room temperature (e.g., 25° C.) to 100° C., and, if necessary, the resulting coating film is washed with water.

The areas with which a monomer comes in contact during polymerization include, for example, agitating blades, an agitating shaft, baffles, a condenser, a header, a search coil, volts and nuts.

Desirably, the above coating liquid is coated, not only on the above areas, but also on areas where polymer scale likely deposits. These areas include, for example, the inner surfaces, and the like, of the equipment and pipelines of an unreacted monomer recovery system, for example, the inner surfaces of a monomer distillation column, a condenser, a monomer storage tank, valves, and the like.

The method for coating the polymerization vessel inner wall with the coating liquid is not particularly restricted and for example, brush coating, spray coating, and a method wherein the polymerization vessel is filled with the coating liquid and thereafter the coating liquid is withdrawn, as well as automatic coating methods described, for example, in Japanese Pre-examination Patent Publication (KOKAI) Nos. 57-61001 and 55-36288, Japanese Patent Publication (KOKOKU) Nos. 56-501116 and 56-501117, and Japanese Pre-examination Patent Publication (KOKAI) No. 59-11303 can be used.

Further, methods for drying a wet coated surface formed after applying the coating liquid is not particularly restricted and include, for example, a method wherein after applying the coating liquid a hot air whose temperature has been suitably elevated (e.g., to 80° C.) is blown to the surface coated and a method wherein surfaces including the polymerization vessel inner wall surface are previously heated, for example, to 30° to 100° C. and are coated directly with the coating liquid. After drying, if necessary, the coated surfaces are washed with water.

The thus obtained coating film has a total coating amount of 0.001 to 5 g/m², and preferably 0.01 to 2 g/m², after being dried.

The above coating operation may be carried out once for polymerization of 1 to 10 batches. Since the formed coating film is high in durability and the polymer scale deposition preventive effect lasts, it is not necessarily required to carry out the coating operation every one batch of polymerization. Thus, the productivity is improved.

Polymerization

As is described above, after the coating film is formed on the inner wall surface of a polymerization vessel, areas with which a monomer comes in contact during polymerization, and the like, vinyl chloride or a monomer mixture containing vinyl chloride as a major component together with a vinyl monomer copolymerizable with vinyl chloride (hereinafter referred to as "vinyl monomer") is polymerized in the polymerization vessel in a usual manner.

The monomer copolymerizable with vinyl chloride includes an α-olefin, such as ethylene, propylene, 1-butene, 1-pentene, 1-hexene, 1-heptene, 1-octene, 1-nonene, 1-decene, 1-undecene, 1-dodecene, 1-tridecene, 1-tetradecene and the like; acrylic acid or its ester, such as acrylic acid, methyl acrylate, ethyl acrylate and the like; methacrylic acid and its ester, such as methacrylic acid, methyl methacrylate and the like; maleic acid or its ester; vinyl esters, such as vinyl acetate, vinyl propionate and the like; vinyl ethers, such as lauryl vinyl ether, isobutyl vinyl ether and the like; maleic anhydride; acrylonitrile; styrene; and vinylidene chloride. They may be used singly or in a combination of two or more thereof.

The polymerization method includes, for example, suspension polymerization, emulsion polymerization, and mass polymerization, with preference being given to suspension polymerization.

In the case of mass polymerization, vinyl chloride or a monomer mixture containing vinyl chloride (generally containing vinyl chloride in an amount of 50% by weight or more) is suspended in an aqueous medium in the presence of a dispersant and then a polymerization initiator is added to carry out the polymerization. The polymerization initiator may be added to the aqueous medium or added during the charging of the monomer. Alternatively, the polymerization initiator may be charged together with the monomer previously and uniformly mixed therewith or may be charged as an aqueous emulsion together with the aqueous medium.

The dispersant may be one generally used in suspension polymerization of vinyl chloride or a monomer mixture containing vinyl chloride in an aqueous medium, for example, water-soluble cellulose ethers, such as methyl cellulose, hydroxyethyl cellulose, hydroxypropyl cellulose, hydroxypropyl methyl cellulose and the like; a water-soluble or oil-soluble partially saponified polyvinyl alcohol; acrylic acid polymer; and water-soluble polymers, such as gelatin and the like. They may be used singly or in a combination of two or more thereof.

These dispersants are added generally in an amount of 0.01 to 5 parts by weight per 100 parts by weight of the charged monomer.

The above polymerization initiator may be one generally used in suspension polymerization of vinyl chloride or a monomer mixture containing vinyl chloride in an aqueous medium, for example, t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxydicarbonate, α,α'-azobisisobutylonitrile, α,α'-azobis-2,4-dimethylvaleronitrile, isobutylyl peroxide, t-hexyl peroxyneohexanoate, 2,4,4-trimethylpentyl peroxy-2-decanoate, and 1-cyclohexyl-1-methylethyl peroxydecanoate.

These polymerization initiators are added generally in an amount of 0.01 to 5 parts by weight per 100 parts by weight of the charged monomer.

As the aqueous medium, generally, deionized water is used.

Further to the polymerization system, it is optional to add a polymerization regulator, a pH adjuster, a gelation improver, an antistatic agent, a crosslinking agent, a stabilizer, a filler, a cure preventive agent, a buffering agent, a scale preventive agent, and the like, which are suitably added in the polymerization system of vinyl chloride or a monomer mixture containing the same as required.

EXAMPLES

The present invention will now be described in detail by reference to Examples and Comparative Examples. Incidentally, in each of Tables given below, experiment Nos. marked with * are Comparative Examples and other experiment Nos. are Examples of the present invention.

[Synthetic Example 1] (Synthesis of Dimer Compound of 2,3-dihydroxynaphthalene)

1,350 ml of methanol was charged in a 3-liter flask equipped with a reflux condenser and then 144 g (0.9 mol) of 2,3-dihydroxynaphthalene was dissolved therein. After dissolving, the temperature was elevated to 65° C. and a solution of 243 g (0.9 mol) of ferric chloride hexahydrate in 450 ml of methanol was added dropwise to the solution over 30 min. under reflux. After the completion of the addition, the reaction was continued for 5 hours while continuing the reflux. Then, the reaction liquid was transferred into 4.5 liters of diluted hydrochloric acid followed by stirring for 12 hours to produce a dimer compound of 2,3-dihydroxynaphthalene. After the obtained reaction liquid was filtered and the solvent was removed, the residue was washed with 2 liters of pure water and then filtered to remove the ferric chloride hexahydrate.

The obtained diner compound of-2,3-dihydroxynaphthalene was dried in a dryer at 40° C.

Identification of Synthesized Compound

The product was analyzed by liquid chromatography and, as a result, it was confirmed that the product was a single component. The following property values were obtained by mass spectrometry and nuclear magnetic resonance spectrometry. In the mass spectrometry, a double-focusing mass spectrometer M-2500 manufactured by Hitachi, Ltd. was used and in the nuclear magnetic resonance spectrometry, a Fourier transform nuclear magnetic resonance spectrometer GSX-270 manufactured by JEOL Ltd. were used.

<Mass Spectrometry>

(m/z)=318 (100%), 271 (15%), 215 (15%), 160 (15%), molecular weight: 318

<Nuclear Magnetic Resonance Spectrometry>

Solvent: acetone-d6

δ (ppm)=6.95–7.08 (m, 4H), 7.16–7.26 (t, 2H), 7.35 (s, 2H), 7.66–7.22 (d, 2H), 8.58 (s, 2H)

Based on the results of the above measurement, it was found that the above product was a dimer compound of 2,3-dihydroxynaphthalene represented by the following formula:

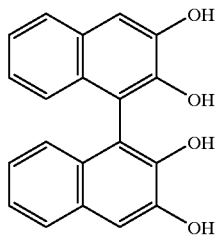

[Synthetic Example 2] (Production of Condensation Product No. 1)

1 liter of pure water was charged into a 3-liter flask equipped with a reflux condenser and then 5 g of sodium hydroxide and 50 g of the 2,3-dihydroxynaphthalene dimer compound obtained in Synthetic Example 1 were charged. Then the temperature was elevated to 70° C. and a solution prepared by dissolving 12.75 g of a 37% aqueous formaldehyde solution in 237.5 g of distilled water was added thereto dropwise over 30 min. After the completion of the addition, the reaction was continued at that temperature for 5 hours, thereafter the temperature was elevated to 95° C. and the reaction was continued for 2 hours to obtain Condensation Product No. 1. Incidentally, all the reaction was carried out in an $N_2$ atmosphere.

After the completion of the reaction, the thus obtained Condensation Product No. 1 was cooled to 25° C. and was stored in an $N_2$ atmosphere.

The number-average molecular weight of Condensation Product No. 1 was measured by GPC to find to be 22,000. Incidentally, the measuring apparatus and the measuring conditions were as follows:

Measurement of Molecular Weight

<Measuring Apparatus>

GPC and RI measuring apparatuses: HLC-8120GPC manufactured by Tosoh Corporation

UV measuring apparatus: UV-8020 manufactured by Tosoh Corporation

<Measuring Condition>

Column: TSK gel Super HM-L×2 columns (an inner diameter of 6.0 mm×a height of 15 cm×2 columns); Column Nos.: S0003 and S0004

Mobile phase: DMF+60 mM phosphoric acid+30 mM lithium bromide

Flow rate: 0.5 ml/min

Measuring temperature: 40° C. (for both OVEN and RI)

Detection: RI and UV (wavelength: 280 nm)

Parenthetically, the determination of the molecular weight was carried out based on a previously prepared calibration curve using a polyethylene glycol standard sample.

[Synthetic Example 3] (Production of Condensation Product No. 2)

1 liter of water, 100 g of 1-naphthol, 50 g of a 37% aqueous formaldehyde solution, and 20 g of sodium hydroxide as a catalyst were charged into a 2-liter three-necked separable flask equipped with a reflux condenser, a thermometer, and an agitator and were heated to 70° C. on an oil bath, and after they were reacted for 4.5 hours in a stream of nitrogen, the reaction mixture was cooled to 25° C. Then the solvent was removed from the reaction mixture and the residue was washed and then dried under a reduced pressure at 50° C. to obtain Condensation Product No. 2. The number-average molecular weight of Condensation Product No. 2 was 970.

The production conditions of Condensation Product Nos. 1 and 2 are shown in Table 1.

TABLE 1

| Condensation product | No. 1 | No. 2 |
|---|---|---|
| (A-1) hydroxynaphthalene compound | 2,3-dihydroxy-naphthalene dimer compound | 1-naphthol |
| (A-2) | formaldehyde | formaldehyde |
| Catalyst | NaOH | NaOH |
| Solvent | water | water |
| Concentration[1]) (mol/l) | 0.43 | 1.84 |
| Molar ratio of (A-1):(A-2):catalyst | 1:1:0.8 | 1:1:0.72 |
| Molecular weight | 22,000 | 970 |

[1])Concentration: total concentration of (A-1), (A-2), and the catalyst.

[Examples and Comparative Examples]
(Experiment Nos. 101 to 105 and Nos. 106* to 110*)

In each experiment, a stainless steel polymerization vessel having an inner volume of 2,000 liters equipped with an agitator was used and the polymerization was carried out as follows.

The condensation product (A), the inorganic colloid (B), the water-soluble polymer compound (C), the solvent, and the alkaline compound shown in Table 2 were mixed so that the conditions [the type of solvent, the total concentration of (A)+(B)+(C), the (A):(B):(C) ratio, and the pH] as shown in Table 2 were secured, thereby preparing a polymer scale deposition preventive agent. In passing, in Experiment No. 106*, no polymer scale deposition preventive agent was used.

The obtained polymer scale deposition preventive agent was coated on the inner wall of the polymerization vessel, the agitating shaft, the agitating blades, and areas with which the monomer came in contact during the polymerization and was heated for 15 min. at 50° C. to be dried to form a coating film and then the coating film was washed with water.

Thereafter, 800 kg of water, 400 kg of vinyl chloride, 500 g of a partially saponified polyvinyl alcohol, 50 g of hydroxypropyl methyl cellulose, and 140 g of 3,5,5-trimethylhexanoyl peroxide were charged in the polymerization vessel and the polymerization was carried out at 66° C. for 6 hours with stirring.

After the completion of the polymerization, the produced polymer and the unreacted monomer were recovered and then the inside of the polymerization vessel was washed with water to remove the residual resin.

The same operation, as one batch which is the aforementioned operation from the formation of the coating film to the washing of the polymerization inner wall with water, was repeated until the number of batches shown in Table 2 was attained.

After completing the final batch, the amount of polymer scale deposited on the liquid phase area in the polymerization vessel and the amount of polymer scale deposited near the interface between the gas phase and the liquid phase were measured by the following method. The results are shown in Table 3.

Measurement of Amount of Deposited Polymer Scale

Polymer scale deposited on the area 10 cm×10 cm at a predetermined position of the polymerization vessel inner wall was scraped off with a spatula and was weighed on a balance. The measured value was multiplied by 100 to find the amount of deposited polymer scale per square meter.

Further, fish eyes in a sheet obtained by forming the polymer produced in each experiment were measured by the following method. The results are shown in Table 3.

Measurement of Fish Eyes 100 parts by weight of the polymer, 50 parts by weight of dioctyl phthalate, 1 part by weight of dibutyl tin dilaurate, 1 part by weight of cetyl alcohol, 0.25 part by weight of titanium oxide, and 0.05 part by weight of carbon black were kneaded by using a 6-inch roll at 150° C. for 7 min. and the mixture was formed into a sheet having a thickness of 0.2 mm. The number of fish eyes in the obtained sheet per 100 cm$^2$ was investigated by a light transmission method.

Further, to evaluate the initial discoloration when the polymer was formed into a sheet, the luminosity index (L value) was measured by the following method. The results are shown in Table 3.

Measurement of Luminosity Index (L value)

A mixture of 100 parts by weight of the obtained polymer, 1 part by weight of a tin laurate stabilizer (TS-101 produced by Akishima Chemical Industries Co., Ltd.), 0.5 part by weight of a cadmium stabilizer (C-100J manufactured by Katsuta Kako K.K.) and 50 parts by weight of dioctyl phthalate as a plasticizer was kneaded by using a two-roll mill and then was formed into a sheet having a thickness of 1 mm.

The obtained sheet was placed in a frame measuring 4 cm×4 cm×1.5 cm and was pressed at a temperature of 160° C. under 65 to 70 kgf/cm$^2$ to prepare a specimen for the measurement.

The luminosity index L of the specimen was found in the following way.

First, the stimulus value Y of XYZ color system was determined by the photoelectric tristimulus colorimetry using the standard light C and photoelectric calorimeter (Color mesuring difference meter Model Z-1001 DP manufactured by Nihon Denshoku Kogyo K.K.) according to JIS Z 8722. Herein, as the geometric condition of illumination and light reception, the condition d defined in section 4.3.1 of JIS Z 8722 was adopted.

Then, the obtained stimulus value Y was substituted in the following Hunter's color difference equation:

$$L = 10 Y^{1/2}$$

as described in JIS Z 8730 (1980) to find the L value. The results are shown in Table 3. In passing, the larger the L value, the higher the whiteness. This shows that the initial discoloration is small.

Measurement of Colored Foreign Matters

A mixture of 100 parts by weight of the polymer, 2 parts by weight of an organic tin maleate stabilizer (TVS N-2000E produced by Nitto Kasei K.K.) and 20 parts by weight of dioctyl phthalate as a plasticizer was placed in a frame measuring 160 mm×130 mm×3 mm and was press-formed at a temperature of 175° C. under a pressure of 35 kg/cm$^2$ to produce a specimen for the measurement. The number of colored foreign matters was examined visually. The results are shown in Table 3.

TABLE 2

| Exp. No. | (A) condensation product | (B) inorganic colloid | (C) water-soluble polymer | Concentration[1] (wt. %) | Weight ratio of (A):(B):(C) | Solvent (weight ratio) | Alkali compound | pH |
|---|---|---|---|---|---|---|---|---|
| 101 | No. 1 | — | — | 0.4 | — | water | NaOH | 9.9 |
| 102 | No. 1 | — | polyvinyl alcohol | 0.45 | 100:0:10 | water | NaOH | 9.9 |
| 103 | No. 1 | — | carboxymethyl-cellulose | 0.42 | 100:0:10 | water | NaOH | 10.0 |
| 104 | No. 1 | — | polyacrylic acid | 0.4 | 100:0:10 | water | NaOH | 9.6 |
| 105 | No. 1 | — | polyvinyl pyrrolidone | 0.45 | 100:0:20 | water | NaOH | 9.7 |
| 106* | — | — | — | — | — | — | — | — |
| 107* | No. 2 | — | — | 0.3 | — | water/methanol (90:10) | NaOH | 12.5 |
| 108* | No. 2 | colloidal silica[2] | — | 0.3 | 100:100:0 | water/methanol (90:10) | NaOH | 12.5 |
| 109* | No. 2 | — | gelatin | 0.3 | 100:0:100 | water/methanol (90:10) | NaOH | 12.5 |
| 110* | No. 2 | coiloidal silica[2] | gelatin | 0.3 | 100:50:100 | water/methanol (90:10) | NaOH | 12.5 |

[1]Concentration: total concentration of (A), (B), and (C)
[2]Colloidal silica: Snowtex CXS-9 having a particle diameter of 5 to 7 mμ (trade name; produced by Nissan Chemical Industries, Ltd.)

TABLE 3

| Exp. No. | Number of batches | Amount of scale deposited (g/m²) | | Fish eyes (number) | Luminosity index (L value) | Colored foreign matters (number) |
| --- | --- | --- | --- | --- | --- | --- |
| | | Liquid phase area | Near gas/liquid interface | | | |
| 101 | 100 | 0 | 2 | 8 | 73.0 | 5 |
| 102 | 150 | 0 | 3 | 5 | 73.0 | 5 |
| 103 | 150 | 0 | 3 | 8 | 73.0 | 4 |
| 104 | 150 | 0 | 3 | 4 | 73.0 | 3 |
| 105 | 150 | 0 | 2 | 5 | 73.0 | 4 |
| 106* | 2 | 450 | 1,200 | 110 | 73.0 | 0 |
| 107* | 10 | 8 | 450 | 60 | 72.5 | 40 |
| 108* | 60 | 5 | 120 | 53 | 72.0 | 70 |
| 109* | 15 | 6 | 200 | 55 | 72.5 | 55 |
| 110* | 100 | 0 | 7 | 12 | 72.0 | 120 |

What is claimed is:

1. A process of producing a vinyl chloride polymer by polymerizing vinyl chloride polymer or a vinyl monomer mixture mainly comprised of vinyl chloride monomer in a polymerization vessel, wherein a coating film comprised of a polymer scale deposition preventive agent comprising an alkaline solution of a condensation product having a molecular weight of 500 to 1,000,000 obtained by condensing a dimer compound of 2,3-dihydroxynaphthalene with formaldehyde has been formed on the inner wall surface of the polymerization vessel and areas with which said monomer or said vinyl monomer mixture comes in contact during the polymerization, wherein said dimer compound of 1,2,3-dihydroxynaphthalene is of the formula

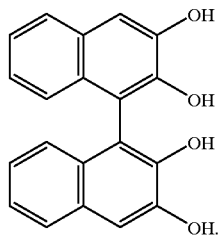

2. The process of producing a vinyl chloride polymer of claim 1, wherein said vinyl monomer mixture is a mixture of vinyl chloride with at least one monomer selected from the group consisting of α-olefins, acrylic acid and its esters, methacrylic acid and its esters, maleic acid and its esters, vinyl esters, vinyl ethers, maleic anhydride, acrylonitrile, styrene, and vinylidene chloride.

3. A process of producing a vinyl chloride polymer, comprising:

polymerizing vinyl chloride monomer mixture comprising mainly vinyl chloride monomer in a polymerization vessel, wherein the inner wall surfaces of the polymerization vessel and other areas of the interior vessel which come into contact with the monomer(s) are coated with a film from applied alkaline solution of a condensation product having a molecular weight of 22,000 prepared by condensing a dimer of 2,3-dihydroxynaphthalene with formaldehyde in an aqueous NaOH catalyst solution in which the total concentration of formaldehyde and 2,3-dihydroxynaphthalene is 0.43 mol/l and the molar ratio of dimer compound of 2,3-dihydroxynaphthalene to formaldehyde to NaOH catalyst is 1:1:0.8, wherein said dimer compound of 1,2,3-dihydroxynaphthalene is of the formula

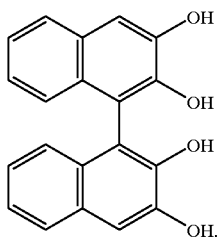

4. The process of claim 1, wherein said condensation product is a product obtained by condensing a dimer compound of 2,3-dihydroxynaphthalene with formaldehyde in a molar ratio of from 1.0/0.5 to 1.0/1.5.

5. The process of claim 1, wherein the molecular weight of said condensation product is 2,500 to 600,000.

6. The process of claim 1, wherein the polymer scale deposition preventive agent further comprises a water-soluble polymer compound.

7. The process of claim 6, wherein said water-soluble polymer compound is at least one compound selected from the group consisting of gelatin, casein, ethylene oxide polymer, ethylene-propylene oxide polymer, polyacrylic acid, polystyrenesulfonic acid, carboxymethyl cellulose, alginic acid, polyvinyl pyrrolidone, chitosan, polyacrylamide, polyvinyl alcohol, hydroxyethyl cellulose, hydroxypropyl cellulose and pectin.

8. The process of claim 1, wherein the polymer scale deposition preventive agent further comprises at least one compound selected from the group consisting of inorganic colloids and alkali metal silicates.

9. The process of claim 8, wherein said inorganic colloids are at least one selected from the group consisting of colloids of oxides and colloids of hydroxides of metals selected from the group consisting of aluminum, thorium, titanium, zirconium, antimony, tin, and iron; colloids selected from the group consisting of tungstic acid, vanadium pentoxide, gold, silver, selenium, sulfur, and silica; and silver iodide sol; and said alkali metal silicates are at least one selected from the group consisting of compounds represented by the general formulae: $M_2SiO_3$, $M_4SiO_4$, $M_2Si_2O_5$, $M_3Si_3O_8$ and $M_4Si_3O_{10}$ wherein M denotes an alkali metal; and water glass.

10. The process of claim 1, wherein a solvent of said alkaline aqueous solution is selected from the group consisting of water and a mixed solvent of water with a hydrophilic organic solvent, the amount of hydrophilic organic solvent being 50% or less based on the mixed solvent.

11. The process of claim 10, wherein said hydrophilic organic solvent is an alcohol.

* * * * *